United States Patent
Juergens, III

[11] Patent Number: 6,032,843
[45] Date of Patent: Mar. 7, 2000

[54] LONGITUDINAL TRANSPORT OF LATERALLY CURVED RESILIENT STRIP

[76] Inventor: Albert M. Juergens, III, 66 Gillotti Rd., New Fairfield, Conn. 06812

[21] Appl. No.: 08/235,332

[22] Filed: Apr. 29, 1994

[51] Int. Cl.⁷ .................................................. B65H 23/34
[52] U.S. Cl. ............................................. 226/88; 352/228
[58] Field of Search ............................ 226/88, 199, 200; 352/228, 221

[56] References Cited

U.S. PATENT DOCUMENTS

| | | | |
|---|---|---|---|
| 1,933,783 | 11/1933 | Wittel | 352/228 |
| 1,939,239 | 12/1933 | Sulzer | 352/228 |
| 2,395,590 | 2/1946 | Simmon et al. | 352/228 |
| 2,427,773 | 9/1947 | Fort | 226/88 |
| 2,479,553 | 8/1949 | Boecking | 352/228 |
| 2,497,847 | 2/1950 | Coutant et al. | 352/221 |
| 2,996,951 | 8/1961 | Debrie | 352/228 |

FOREIGN PATENT DOCUMENTS

| | | | |
|---|---|---|---|
| 284820 | 4/1931 | Italy | 352/228 |
| 26452 | 10/1913 | United Kingdom | 352/228 |

*Primary Examiner*—Donald P. Walsh
*Assistant Examiner*—Emmanuel M. Marcelo
*Attorney, Agent, or Firm*—Charles J. Brown

[57] ABSTRACT

A method for transporting a flexible resilient strip longitudinally within a processing station so that a nominally curved lateral cross section of the strip is substantially flattened wherein the strip is advanced along an arcuate path to bend longitudinally and by that bending cause the nominally curved lateral cross section to collapse to a substantially flat lateral cross section without longitudinal tensioning of the strip.

1 Claim, 3 Drawing Sheets

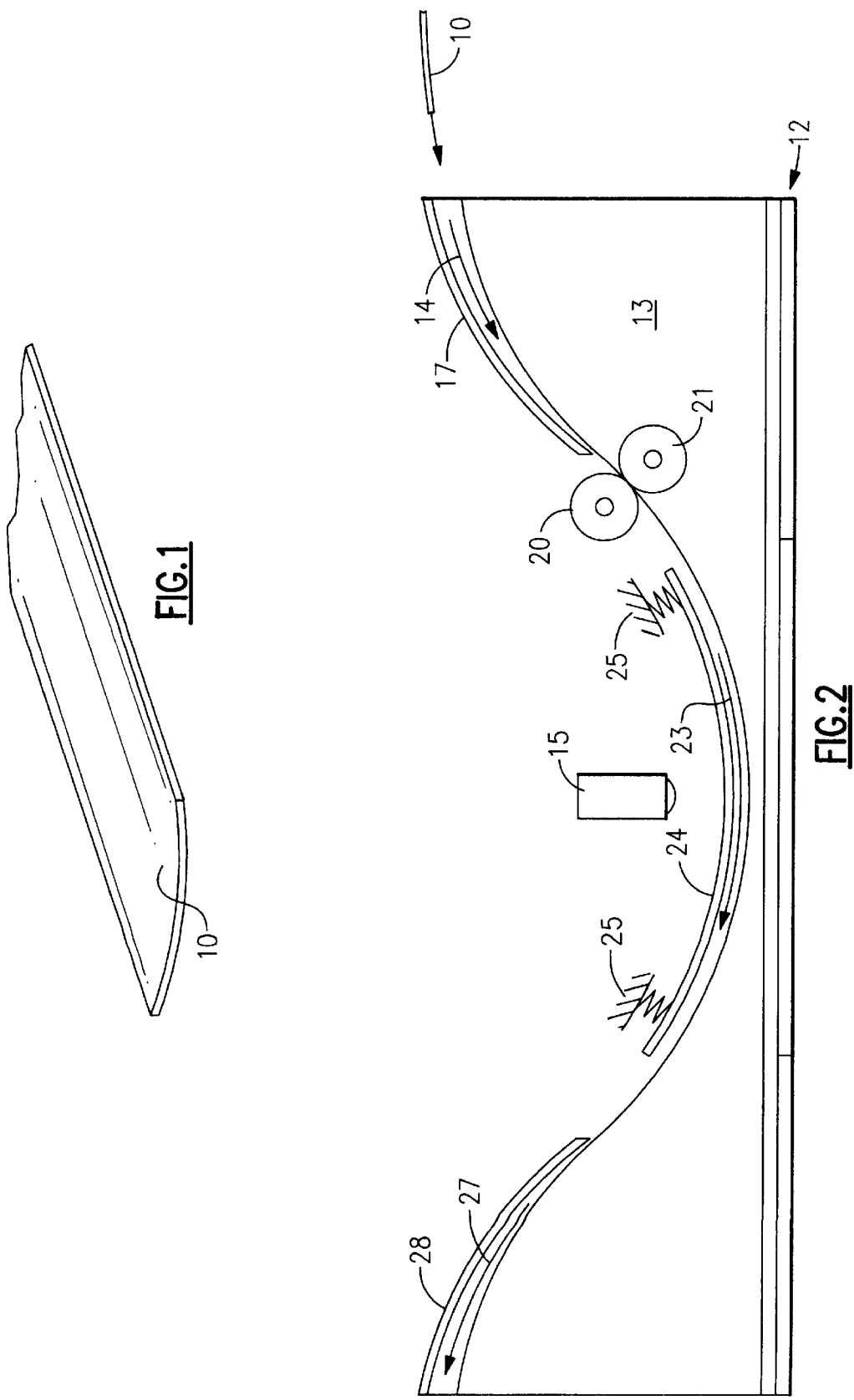

LONGITUDINAL TRANSPORT OF LATERALLY CURVED RESILIENT STRIP

BACKGROUND OF THE INVENTION

Certain forms of flexible and resilient strip material, such as venetian blind slats, have a nominally curved lateral cross section. Film strip is of that configuration with a lateral curve which is concave on an emulsion-coated side. The general field of the present invention concerns methods and apparatus for transporting such strip longitudinally through a processing station with the lateral cross section of the strip flattened.

In film strip production various procedures for developing and optically scanning the strip during production and quality control involve moving an elongated section of the strip longitudinally in a processing station with the nominally curved lateral cross section of the strip maintained substantially flat. One method of doing this is simply to press the strip between overlaying rigid plates, one or both of which may be transparent for developing or scanning purposes. Refinements include subjecting the concave side of the laterally curved strip to a vacuum to draw it down against one of the plate to augment the flattening effect of the opposed plate pressing against the convex side.

A particularly relevant prior art system is described in U.S. Pat. No. 2,479,553, which concerns motion picture film projecting apparatus for correction of spherical aberrations. This patent recognizes that film strip has a nominal lateral curve which is concave on the emulsion side, and it further recognizes the need to flatten that lateral curve as the strip is transported through a station where projection light passes through the film. The solution proposed is to advance the strip through the station by roller pairs which impose longitudinal tension on the strip and at the same time pressing the edges of the strip by means of pressure shoes against a convex curved gate having an aperture through which the projection light passes.

It is known, of course, that certain flexible resilient strip material having a nominally curved lateral cross section will collapse or snap into a substantially laterally flat cross section when the strip is bent longitudinally. Snap action devices such as bowed springs operate on that principle; see for example the bowed spring described in *Mechanisms & Mechanical Devices Sourcebook* by Nicholas P. Chironis, McGraw-Hill, Inc. 1991 at page 218. This snap action can be demonstrated by a push-pull type steel measuring tape which has nominal lateral curve. With the lateral curve facing concave side upward the tape can be cantilevered out a substantial distance without bending under its own weight, but when it does buckle its lateral cross section in the region of the bend becomes substantially flat.

It is a principal object of the present invention to apply this self-flattening capability of resilient strip to a strip transport system without flattening the strip between plates or subjecting it to tension or to sliding contact with pressure shoes, as in the prior art.

SUMMARY OF THE INVENTION

The invention constitutes an improvement in processing a longitudinal zone on one side of an elongated flexible resilient strip having a nominally curved lateral cross section. The improvement resides in a method of transporting the strip longitudinally within a processing station with the strip lateral cross section substantially flat. The improved method comprises the first step of advancing the strip longitudinally toward the processing station along an arcuate path to bend the strip longitudinally and by that bending cause the nominally curved lateral cross section to collapse to a substantially flat lateral cross section. The strip is then displaced longitudinally within the processing station without longitudinal tensioning of the strip while maintaining the substantially flat lateral cross section of the strip. Thereafter the strip is removed longitudinally from the processing station and is longitudinally straightened to permit the substantially flat lateral cross section of the strip to return to its nominally curved lateral cross section.

In a preferred form of the method of the invention the longitudinal bend in the strip is convex on the zone side of the strip and the nominally curved lateral cross section of the strip is concave on the zone side of the strip. When the lateral cross section is concave on the zone side of the strip the collapse of the strip to a substantially flat lateral cross section is by a snap action.

After the strip is longitudinally advanced along the above-mentioned arcuate path it may be moved along a second arcuate path in the processing station to impart a second longitudinal bend to the strip. In that case the second longitudinal bend in the strip may be concave on the zone side of the strip. The first-mentioned longitudinal bend may fair directly into the second longitudinal bend. Moreover, the strip may move along a third arcuate path after the second arcuate path, the third arcuate path being after the processing station and remote from the first-mentioned arcuate path thus imparting a third longitudinal bend in the strip. That third longitudinal bend may be convex on the zone side of the strip. The second longitudinal bend may fair directly into the third longitudinal bend. The strip may be removed longitudinally from the processing station through the first-mentioned arcuate path in a direction opposite the initial advance along arcuate path.

The strip may be a film strip having an emulsion coating on the zone side and in which the nominally curved lateral cross section of the strip is concave on the emulsion-coated zone side, and the processing station may be a scanning station.

The strip may also be moved laterally as well as longitudinally within the processing station.

BRIEF DESCRIPTION OF THE DRAWINGS

FIG. 1 is a fragmentary perspective of an end portion of the strip showing the lateral curved cross section somewhat exaggerated;

FIG. 2 is a somewhat schematic longitudinal side view of one of the tracks of the apparatus illustrating the successive paths for the strip and showing guides for confining the strip on the tracks in the various paths.

DESCRIPTION OF PREFERRED EMBODIMENT

Figure 3:
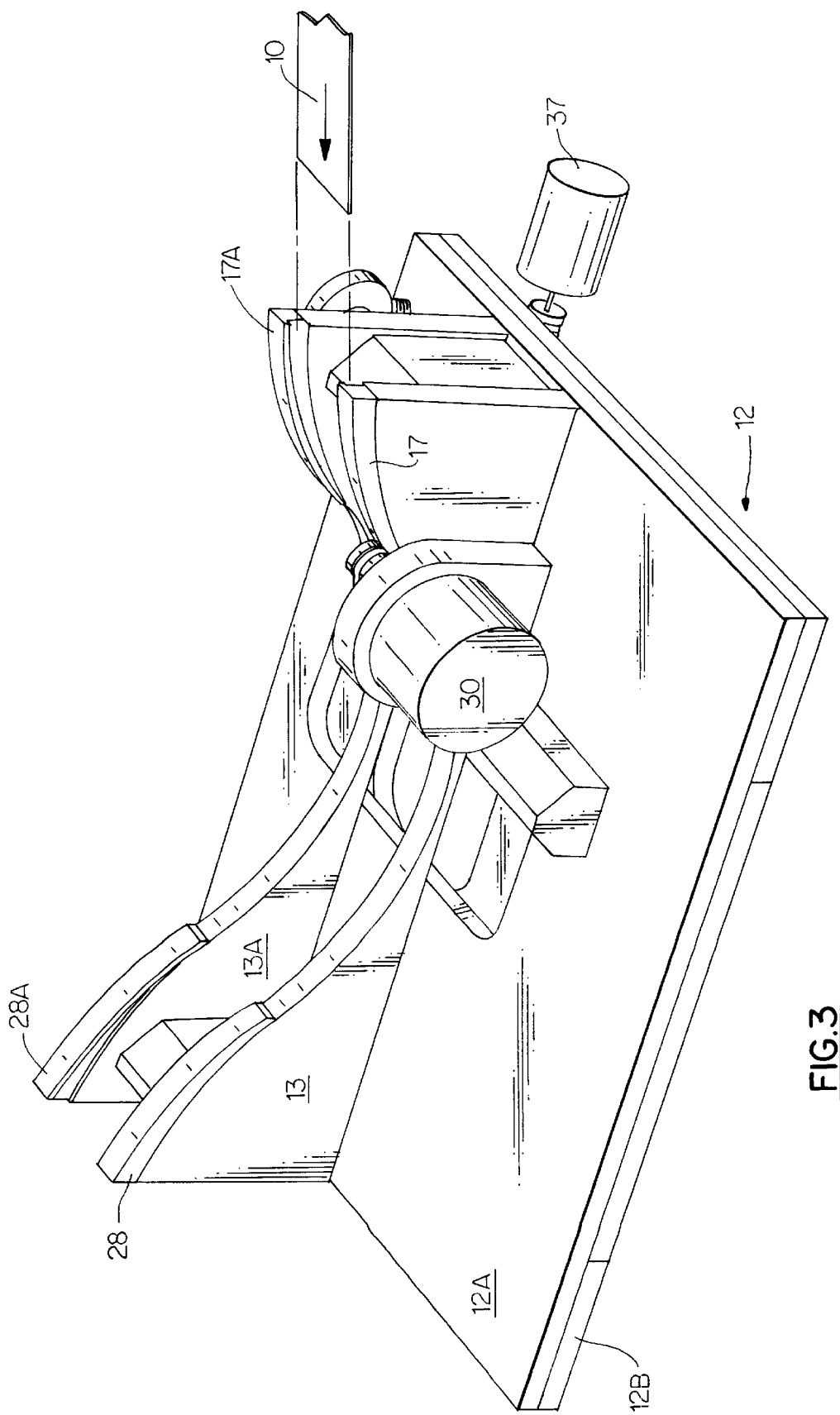
FIG. 3 is a perspective view of the apparatus for the method of the invention viewed from one side of that end of the apparatus into which the strip is inserted.

Referring first to FIG. 1 a short longitudinal end portion of a resilient flexible strip 10 is shown with its laterally curved cross section. In film production the strip 10 may be of a transparent acetate composition with a coating of an emulsion on one side which causes the strip to assume the nominal shape shown in FIG. 1 with the emulsion coating on the concave side of the lateral curve. Halation latitude tests are commonly carried out to determine the ability of such film to limit the amount of internal reflection which would cause unwanted exposure. Such tests include developing on the emulsion side of the film separate rows of blocks of successively greater exposure over and alongside an opaque longitudinal stripe. All together these rows of blocks and the stripe are referred to herein as a longitudinal zone on the strip and their particular configuration forms no part of this invention.

After being developed the strip is scanned to measure transmittance based upon the characteristics of the rows of blocks in relation to the opaque stripe in order to compute halation latitude values. Again, the details of this process are not part of the invention. The relevance of the process is that it requires the elongated strip 10 to be transported both longitudinally and laterally within a processing station for scanning the longitudinal zone on the concave side of the strip.

In my U.S. Pat. No. 5,497,060 entitled "Positioning Stage", there is disclosed a stage wherein encoder pair means on a table, which is movable on a frame by a drive and transmission system, generate a signal independent of lost motion in that system so that a microprocessor can fix the position of the table in a predetermined position with respect to the frame irrespective of that lost motion. That form of positioning stage is particularly applicable to X-Y longitudinal-lateral movement of the film strip 10 as it is optically scanned in the processing station in accordance with the present invention.

The specific problem with which the method of the invention is concerned is how to transport the film strip 10 longitudinally through the scanning stage while maintaining the nominally curved lateral cross section of the strip in a substantially flattened form. It is unacceptable to the optical scanning process that the strip be transported longitudinally in the scanning station while it remains with its nominally curved lateral cross section.

FIG. 2 is a somewhat schematic illustration of apparatus for carrying out this method so as to achieve the flattening of the lateral cross section in the scanning station. The apparatus includes a table 12 mounted for X-Y indexing on a frame as described hereinafter. FIG. 2 shows one of two parallel tracks 13 defining a first convex arcuate path illustrated by an arrow 14 leading toward a scanning station beneath an optical scanning device 15. The strip 10 enters the apparatus from the right as shown in FIG. 2 to pass beneath a first arcuate guide 17 fixed with respect to the track 13. The guide 17 functions to funnel the strip 10 passively along the track 13 as the strip follows the convex curve of the first path 14. Only the edge portions of the strip are engaged by the tracks.

In typical photographic processes the optical scanning device 15 should view the emulsion-coated side of the film strip 10 while a light source (not shown) directs light upwardly through the film and its emulsion coating to the optical scanning device 15. This being so, the laterally curved film strip 10 is disposed with its concave emulsion-coated side facing upwardly as it enters the apparatus from the right where shown in FIG. 1.

It will be evident that the convex arcuate first path 14 along which the strip 10 is caused to travel introduces longitudinal bending in the strip 10. The radius of curvature of the arcuate first path 14 is sufficiently great that this longitudinal bending of the strip 10 causes it to reach and exceed that point where the lateral curved cross section collapses or buckles in a snap action to a substantially flat lateral cross section.

After leaving the first guide 17 the strip while still laterally flat passes between a pair of rollers 20 and 21. The working faces of the rollers 20 and 21 may be defined by inset rubber O-rings. The roller 20 is a positive drive which displaces the strip longitudinally along the first arcuate path 14 without longitudinal tensioning of the strip. The roller 21 opposite the drive roller 20 is a follower operatively connected to the positioning stage apparatus referred to hereinafter to permit movement of the table 12 on its frame to selectively position and reposition the strip 10 in the scanning station beneath the optical device 15.

The convex first path 14 fairs directly into a second arcuate path illustrated by the arrow 23 in FIG. 2. The second path is concave and since the strip 10 is not permitted to advance in a straight longitudinal course between the first and second arcuate paths 14 and 23 its flat lateral cross section remains in place. As the strip 10 moves longitudinally in the scanning station beneath the optical scanning device 15 along the second concave arcuate path 23, it may be confined against the track 13 by a curved resilient second guide 24 biased by spring means schematically shown at 25 toward that edge portion of the strip travelling along the track 13. It is not the function of the second guide 24 to press the edge of the strip 10 against the track 13, as do the pressure shoes in the previously mentioned U.S. Pat. No. 2,479,553, but rather to allow the strip to float freely along the curved second path 23 without lifting away from the track 13. The flattened lateral cross section of the strip 10 would snap back to its laterally curved cross section if the strip 10 were permitted to lift too far away from the track 13 in the second arcuate path 23, and the guide 24 prevents that.

The track 13 also defines a third arcuate path illustrated by the arrow 27. The third arcuate path 27 is convex and the second concave arcuate path 23 fairs directly into it without an intervening straight longitudinal path so that the substantially flat lateral cross section of the strip 10 continues to be maintained. A third guide 28 similar to the first guide 17 confines the strip 10 to the track 13 along this third convex arcuate path 27.

Depending upon the particular process, the strip 10 may be transported only in one direction successively through the first, second and third paths of travel 14, 23 and 27 so as to exit from the apparatus to the left as seen in FIG. 2. In that case it is not necessary to include the spring biased second guide 24 because in that mode the strip 10 tends to hold itself against the track 13 as it is pushed through the second path of travel 23 by the rollers 20 and 21. However, the process may be such that the strip 10 enters the apparatus and exits from it by reversing its longitudinal direction, to and from the right as seen in FIG. 2, without passing from the apparatus to the left. It is in that mode of operation that the second guide 24 is required because otherwise the rollers 20 and 21 would tend to lift the strip 10 off the track 13 in the second path of travel 23 as the strip is pulled from that second path to the right during removal as seen in FIG. 2.

Figure 4:
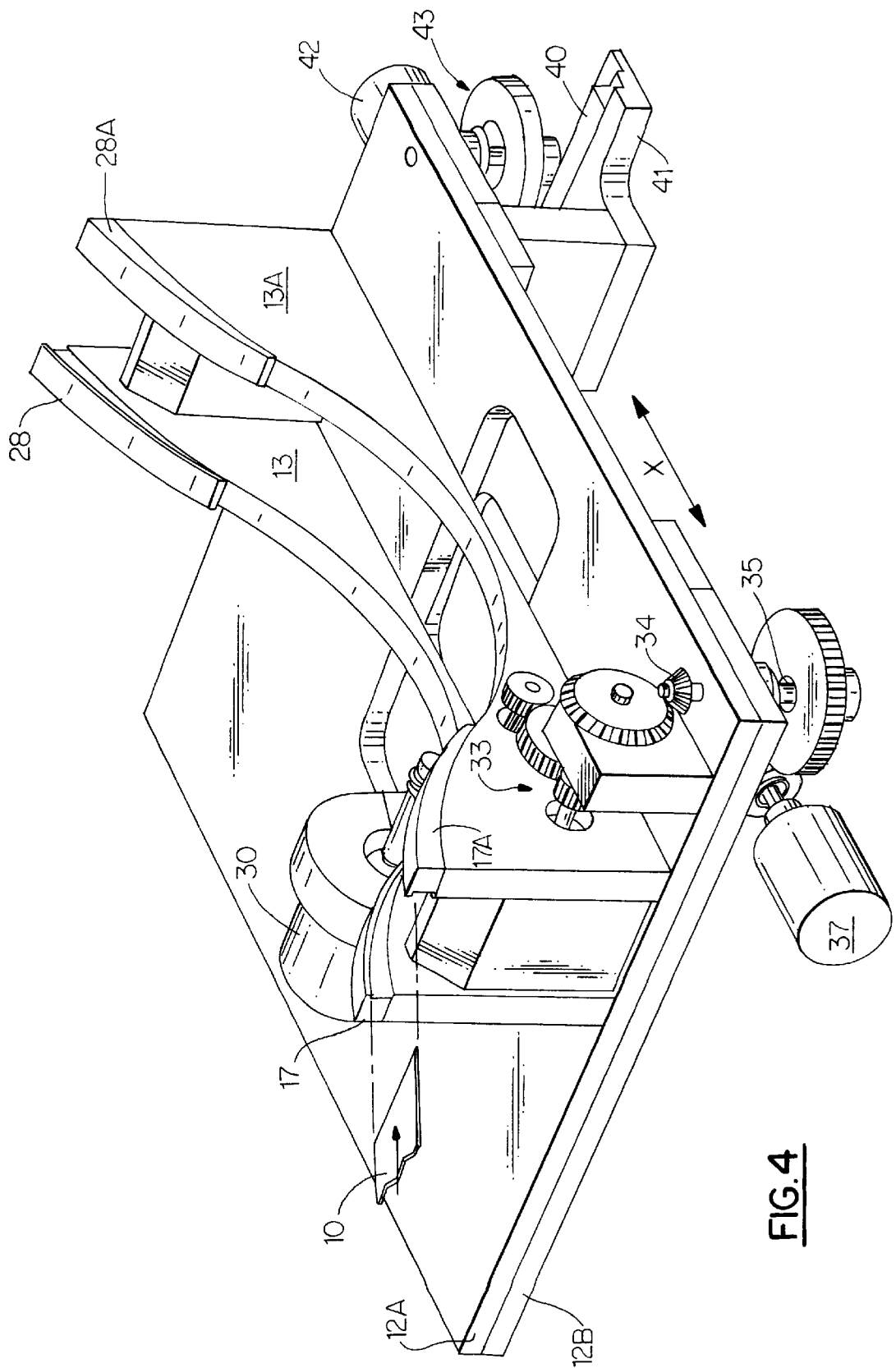
FIG. 4 is a perspective view similar to FIG. 3 but from the opposite side of that end of the apparatus.

Referring now to FIGS. 3 and 4 the components of the apparatus are shown in more detail. The track 13 is paired with a parallel track 13A, the first guide 17 is paired with a second guide 17A and the third guide 28 is paired with a third guide 28A. The guides 17–17A and 28–28A are shown comprising opposed lip edges under which the strip edge portions pass. The second guide 24 and the optical scanning device 15 are not shown in FIGS. 3 and 4, but there would be a second guide paired with guide 24 if second guides were employed.

A motor 30 operates the drive roller 20. The opposite roller 21 is connected to a gear train 33 to follow a bevel gear 34 on a shaft 35.

The positioning stage components of the apparatus include an X-axis drive motor 37 which indexes a first table plate 12A by a gear train 38 in the X direction shown by the arrows in FIG. 4 parallel to longitudinal movement of the strip 10. A second table plate 12B is capable of being indexed in a Y direction along a Y rack 40 on a frame 41 by a Y-motor 42 operating through a gear train 43. These positioning stage components of the apparatus for movement in the X and Y direction are not detailed herein since they are fully disclosed in my aforementioned copending application.

In operation, the strip 10 is inserted between and under the first guides 17 and 17A and pushed along the convex first path 14 until its forward end enters between the rollers 20 and 21. In doing so the laterally curved cross section of the strip 10 snaps into laterally flat form as described previously. The motor 30 is then operated to advance the strip 10 to the left as shown in FIG. 2, under the second guide 24 if there be any, to carry it along the second path 23 beneath the optical scanning device 15 while the lateral cross section of the strip remains flat. Only the edges of the strip 10 are engaged by the tracks 13 and 13A so that the optical device 15 can scan the longitudinal zone of the strip 10 between the tracks. At no time during this scanning operation is the strip 10 under any measurable tension nor are its edges pushed downwardly against the tracks 13 and 13A. By appropriate operation of the motors 30, 37 and 42 the strip may be moved forwardly and backwardly in a longitudinal direction (X) and also laterally side-to-side (Y) with assurances that it can be returned accurately to any selected reference position. If forward longitudinal movement requires it, the forward edge of the strip 10 moves up between and under the third guides 28 and 28A along the third path 27, and still the laterally flat configuration remains. The strip may be removed longitudinally from the scanning station either to the right of the first path 14 or to the left of the third path 27 as seen in FIG. 2, and when it is thus removed and longitudinally straightened the substantially flat lateral cross section of the strip returns to its nominally curved lateral cross section.

The scope of the invention in terms of the method is to be determined from the following claims rather than from the foregoing description of preferred embodiments thereof.

I claim:

1. In processing a longitudinal zone on one side of an elongated flexible resilient strip having a nominally curved lateral cross section, a method of transporting said strip longitudinally within a processing station with the strip lateral cross section flat which comprises a) advancing the strip longitudinally toward the processing station along an arcuate path to bend the strip longitudinally and by that bending cause the nominally curved lateral cross section to snap to a flat lateral cross section, b) displacing the strip longitudinally within the processing station without longitudinal tensioning of the strip while maintaining the flat lateral cross section of the strip, and c) removing the strip longitudinally from the processing station and longitudinally straightening the strip to permit the flat lateral cross section of the strip to snap back to its nominally curved lateral cross section.

\* \* \* \* \*